(12) United States Patent
Shallbetter et al.

(10) Patent No.: US 11,390,779 B2
(45) Date of Patent: Jul. 19, 2022

(54) FILM CONSTRUCTIONS AND ARTICLES

(71) Applicant: 3M INNOVATIVE PROPERTIES COMPANY, St. Paul, MN (US)

(72) Inventors: Dylan J. V. Shallbetter, Oakdale, MN (US); Jeffrey O. Emslander, Grant, MN (US); Christopher J. Rother, Hudson, WI (US); Mark E. Schwartz, Maplewood, MN (US); Jacob D. Young, St. Paul, MN (US); Shaun M. West, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 481 days.

(21) Appl. No.: 16/497,228

(22) PCT Filed: Mar. 21, 2018

(86) PCT No.: PCT/IB2018/051893
§ 371 (c)(1),
(2) Date: Sep. 24, 2019

(87) PCT Pub. No.: WO2018/178814
PCT Pub. Date: Oct. 4, 2018

(65) Prior Publication Data
US 2021/0122948 A1 Apr. 29, 2021

Related U.S. Application Data

(60) Provisional application No. 62/562,521, filed on Sep. 25, 2017, provisional application No. 62/476,949, filed on Mar. 27, 2017.

(51) Int. Cl.
*C09J 7/40* (2018.01)
*C09J 7/24* (2018.01)
*C09J 7/25* (2018.01)

(52) U.S. Cl.
CPC ............... *C09J 7/401* (2018.01); *C09J 7/243* (2018.01); *C09J 7/255* (2018.01); *C09J 2423/045* (2013.01); *C09J 2467/005* (2013.01)

(58) Field of Classification Search
CPC ... C09J 7/401; C09J 7/243; C09J 7/255; C09J 2423/045; C09J 2467/005; B32B 27/36; C09D 167/04; C08L 67/04
See application file for complete search history.

(56) References Cited

U.S. PATENT DOCUMENTS 5,726,220 A * 3/1998 Tokushige ............... C08L 67/04
525/190
6,316,120 B1 11/2001 Emslander
(Continued)

FOREIGN PATENT DOCUMENTS

EP 2689859 1/2014
WO WO 01-72918 10/2001
(Continued)

OTHER PUBLICATIONS

Akrowax® EBS 290 Product data sheet, Akrochem Corporation, Akron, Ohio, Nov. 2009, 1 page.
(Continued)

*Primary Examiner* — Scott R. Walshon

(57) ABSTRACT

Film constructions and articles including the film constructions, wherein a film construction includes: a backing (or an adhesive layer) having a first major surface and a second major surface; and a release layer disposed on the first major surface of the backing (or adhesive layer), wherein the release layer includes polylactic acid.

19 Claims, 2 Drawing Sheets

(56) References Cited

U.S. PATENT DOCUMENTS

| | | |
|---|---|---|
| 6,361,844 B1 | 3/2002 | Ou-Yang |
| 6,465,091 B1 | 10/2002 | Ou-Yang |
| 6,531,214 B2 | 3/2003 | Carter |
| 6,541,109 B1 | 4/2003 | Kumar |
| 6,919,405 B2 | 7/2005 | Kinning |
| 7,411,020 B2 | 8/2008 | Carlson |
| 7,682,771 B2 | 3/2010 | Liu |
| 9,187,678 B2 | 11/2015 | Boardman |
| 9,394,467 B2 | 7/2016 | Takahira |
| 2005/0131120 A1* | 6/2005 | Flexman ............ C08L 67/04 524/399 |
| 2011/0213101 A1* | 9/2011 | Shi ............ C08L 67/02 525/437 |
| 2011/0287206 A1* | 11/2011 | Suwa ............ C08L 33/08 428/220 |
| 2012/0213959 A1* | 8/2012 | Schuhmann ............ B32B 27/36 428/447 |
| 2013/0130005 A1 | 5/2013 | Chapman |
| 2014/0377540 A1 | 12/2014 | Ishiguro |

FOREIGN PATENT DOCUMENTS

| | | |
|---|---|---|
| WO | WO 2008-036334 | 3/2008 |
| WO | WO 2010-088067 | 8/2010 |
| WO | WO 2015-017309 | 2/2015 |
| WO | WO 2017-189304 | 11/2017 |
| WO | WO 2018-022495 | 2/2018 |
| WO | WO 2018-106486 | 6/2018 |

OTHER PUBLICATIONS

Shores, "Second Generation Release Agents: Aqueous and Fast Drying", Hitac Adhesives and Coatings, Inc. Venice, CA, [retrieved from the internet on Nov. 21, 2019] URL <https://www.pstc.org/files/public/Shores.pdf>, 10 Pages.

International Search Report for PCT International Application No. PCT/IB2018-051893, dated Jun. 26, 2018, 4pgs.

* cited by examiner

FILM CONSTRUCTIONS AND ARTICLES

CROSS REFERENCE TO RELATED APPLICATIONS

This application is a national stage filing under 35 U.S.C. 371 of PCT/IB32018/051893, filed Mar. 21, 2018, which claims the benefit of United States Provisional Application Nos. 62/476,949, filed Mar. 27, 2017, and 62/562,521, filed Sep. 25, 2017, the disclosures of which are incorporated by reference in their entirety herein.

BACKGROUND

Traditional masking tapes have utilized paper-based backings since their invention in the first part of the 1900's. Recent advancements in technology and materials have opened new pathways to the production of polymeric-based backings for masking tape, which offer several advantages over paper-based backings. Polymeric-based backings often do not need to be saturated, primed, or release coated like paper-based backings, which reduces manufacturing time, eliminates solvents from the manufacturing process, and can reduce process waste.

One of the difficulties that needs to be overcome with current polymeric-based backings is that they are often times not receptive to paint. For masking tape, it is generally preferred to have a paintable backing. Polyethylene, polypropylene, and other current polymeric-backed tapes can be hard to paint, and may require additional additives to make them paintable (or printable, or otherwise image receptive).

SUMMARY

The present disclosure is directed to film constructions and articles including such film constructions. The film constructions include those with a backing having a release layer that includes polylactic acid ("PLA" or polylactic acid polymer). Alternatively or additionally, the film constructions include those with an adhesive layer having a release layer that includes polylactic acid. Typically, the polylactic acid contributes to the paintability, printability, or otherwise image receptivity of the release layer.

In certain embodiments, a film construction is provided that includes: a backing having a first major surface and a second major surface; and a release layer disposed on (either directly or indirectly) the first major surface of the backing, wherein the release layer includes polylactic acid. Such backing may include one or more layers, which may or may not also include polylactic acid. In one embodiment, an adhesive layer (which may include a pressure sensitive adhesive) is disposed on the second major surface of the backing.

In certain embodiments, the release layer includes a mixture of polylactic acid and an ethylene-containing copolymer including a polar comonomer. The polar comomoner is one that enhances the releasability of the release layer and does not adversely impact the paintability, printability, or otherwise image receptivity of the release layer. In this context, an ethylene-containing copolymer including a polar comonomer means that the ethylene-containing copolymer is derived from ethylene and one or more polar comonomers.

In certain embodiments, a film construction is provided that includes: an adhesive layer having a first major surface and a second major surface; and a release layer disposed on the first major surface of the adhesive layer, wherein the release layer includes polylactic acid.

In one embodiment, an article is provided that includes a film construction described herein. Such articles may include a masking tape, decorative tape, box-sealing tape, decorative tape, bundling tape, medical tape, transfer tape, single-sided adhesive tape, and other tapes known to those skilled in the art.

Definitions

The term "alkyl" means a linear or branched, cyclic or acyclic, saturated monovalent hydrocarbon. The term "alkaryl" refers to a monovalent group that is an aryl substituted with an alkyl group (e.g., as in a tolyl group). The term "aryl" refers to a group that is aromatic and, optionally, carbocyclic.

The terms "includes" and "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or function specified in the disclosure for the listed elements. Thus, the phrase "consisting essentially of" indicates that the listed elements are required or mandatory, but that other elements are optional and may or may not be present depending upon whether or not they materially affect the activity or function of the listed elements.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. For example, a composition that includes "a" colorant may include "one or more" colorants.

As used herein, the term "or" is generally employed in its sense including "and/or" unless the content clearly dictates otherwise. The term "and/or" means one or all of the listed elements or a combination of any two or more of the listed elements.

As used herein, all numbers are assumed to be modified by the term "about" and in certain embodiments by the term "exactly." Notwithstanding that the numerical ranges and parameters setting forth the broad scope of the invention are approximations, the numerical values set forth in the specific examples are reported as precisely as possible. All numerical values, however, inherently contain certain errors necessarily resulting from the standard deviation found in their respective testing measurements.

Also herein, the recitations of numerical ranges by endpoints include all numbers subsumed within that range (e.g., 1 to 5 includes 1, 1.5, 2, 2.75, 3, 3.80, 4, 5, etc.). Herein, "up to" a number (e.g., up to 50) includes the number (e.g., 50).

The term "in the range" or "within a range" (and similar statements) includes the endpoints of the stated range.

Groupings of alternative elements or embodiments disclosed herein are not to be construed as limitations. Each group member may be referred to and claimed individually or in any combination with other members of the group or other elements found therein. It is anticipated that one or more members of a group may be included in, or deleted from, a group for reasons of convenience and/or patentability. When any such inclusion or deletion occurs, the specification is herein deemed to contain the group as modified thus fulfilling the written description of all Markush groups used in the appended claims.

When a group is present more than once in a formula described herein, each group is "independently" selected, whether specifically stated or not. For example, when more than one Y group is present in a formula, each Y group is independently selected. Furthermore, subgroups contained within these groups are also independently selected. For example, when each Y group contains an R, then each R is also independently selected.

Reference throughout this specification to "one embodiment," "an embodiment," "certain embodiments," or "some embodiments," etc., means that a particular feature, configuration, composition, or characteristic described in connection with the embodiment is included in at least one embodiment of the invention. Thus, the appearances of such phrases in various places throughout this specification are not necessarily referring to the same embodiment of the invention. Furthermore, the particular features, configurations, compositions, or characteristics may be combined in any suitable manner in one or more embodiments.

The above summary of the present disclosure is not intended to describe each disclosed embodiment or every implementation of the present invention. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list.

DETAILED DESCRIPTION OF ILLUSTRATIVE EMBODIMENTS

The present disclosure is directed to film constructions and articles including such film constructions, such as masking tapes, decorative tapes, box-sealing tapes, decorative tapes, bundling tapes, medical tapes, transfer tapes, single-sided adhesive tapes, and other tapes or release articles known to those skilled in the art. In certain embodiments, such film constructions and articles are paintable, printable, or otherwise image receptive. In those embodiments that are paintable, film constructions of the present disclosure are particularly suitable as masking tapes.

Figure 1:
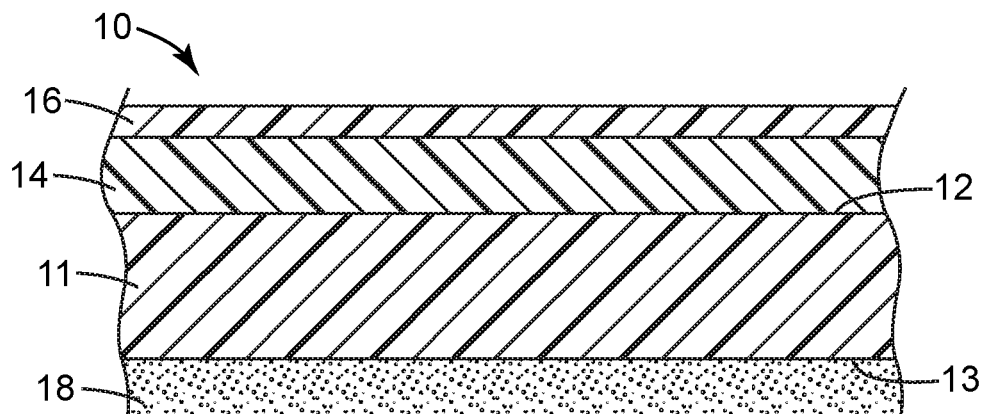
FIG. 1 is a cross-sectional representation of an exemplary film construction having a release layer disposed on a backing with an optional adhesive layer and optional tie layer (wherein the layers are not necessarily to scale).

As shown in FIG. 1, in one embodiment of the present disclosure there is provided a film construction 10 having a backing 11 that has a first major surface 12 and a second major surface 13. The backing 11 may include one or more layers (not specifically shown). Disposed on (either directly or indirectly) the first major surface 12 of the backing 11 is a release layer 16. In certain embodiments, disposed on the first major surface 12 of the backing 11 is a tie layer 14, and disposed on the tie layer 14 is the release layer 16. Thus, in such embodiments, the release layer is indirectly disposed on the backing and directly disposed on the tie layer. In certain embodiments (not shown), disposed directly on the first major surface 12 of the backing 11 is a release layer 16. In certain embodiments, disposed on the second major surface 13 of the backing 11 is an adhesive layer 18 (e.g., a pressure sensitive adhesive). Although not shown, a tie layer may also be disposed between the backing and the adhesive layer. Such film constructions could be used as masking tapes.

Figure 2:
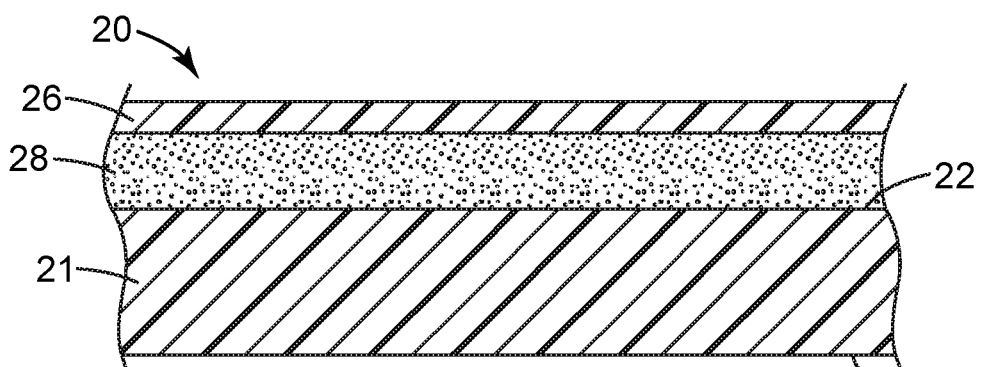
FIG. 2 is a cross-sectional representation of an exemplary film construction having an adhesive layer disposed between a backing and a release layer (wherein the layers are not necessarily to scale).

As shown in FIG. 2, in one embodiment of the present disclosure there is provided a film construction 20 having a backing 21 that has a first major surface 22 and a second major surface 23. The backing 21 may include one or more layers (not specifically shown). Disposed on (either directly or indirectly) the first major surface 22 of the backing 21 is an adhesive layer 28 (e.g., a pressure sensitive adhesive), and disposed on the adhesive layer 28 is a release layer 26. Although not shown, a tie layer may be disposed between the backing and the adhesive layer. Such film construction could be used as a single-sided adhesive tape with a release layer thereon.

Figure 3:
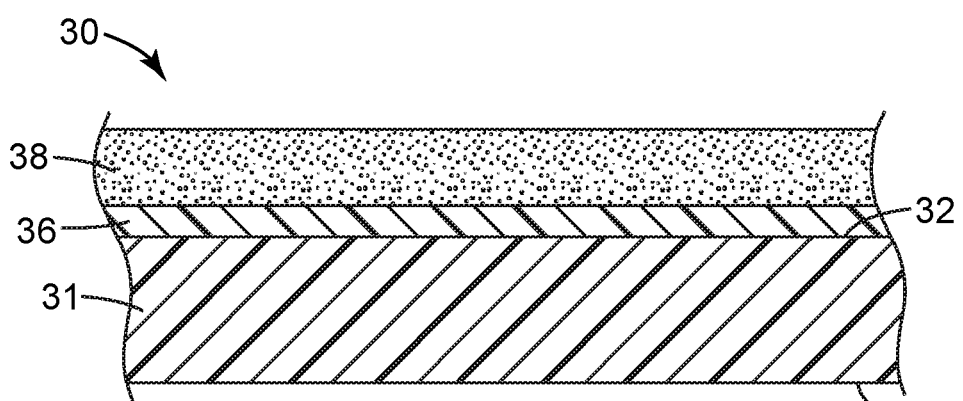
FIG. 3 is a cross-sectional representation of an exemplary film construction having a release layer disposed between an adhesive layer and a backing (wherein the layers are not necessarily to scale).

As shown in FIG. 3, in one embodiment of the present disclosure there is provided a film construction 30 having a backing 31 that has a first major surface 32 and a second major surface 33. The backing 31 may include one or more layers (not specifically shown). Disposed on the first major surface 32 of the backing 31 is a release layer 36. Disposed on the release layer 36 is an adhesive layer 38 (e.g., a pressure sensitive adhesive). Such film construction could be used as a release article such as a transfer tape.

Figure 4:
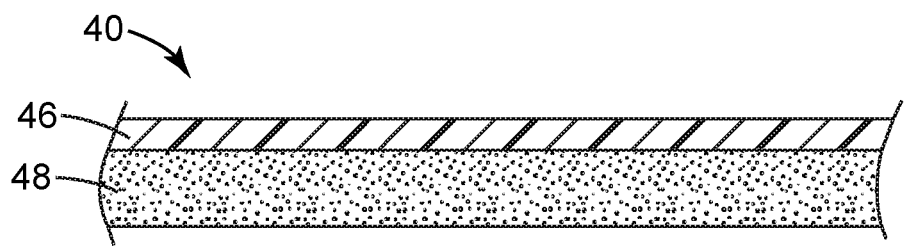
FIG. 4 is a cross-sectional representation of an exemplary film construction having a release layer disposed on an adhesive layer (wherein the layers are not necessarily to scale).
Figure 5:
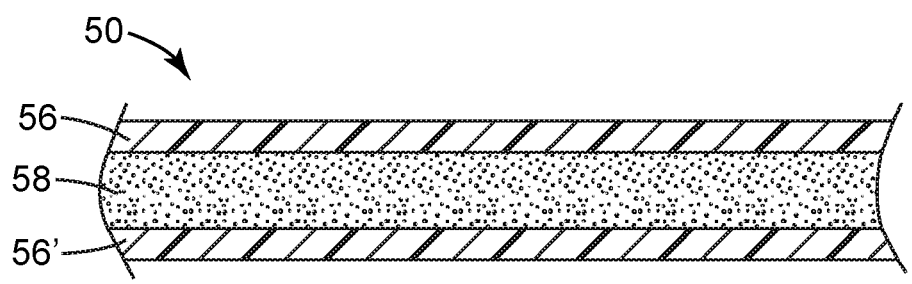
FIG. 5 is a cross-sectional representation of an exemplary film construction having an adhesive layer disposed between two release layers (wherein the layers are not necessarily to scale).

As shown in FIGS. 4 and 5, in certain embodiments of the present disclosure there are provided film constructions 40 and 50, each having an adhesive layer 48 and 58 (e.g., a pressure sensitive adhesive), respectively, having two major surfaces, and on one major surface (FIG. 4) or on both major surfaces (FIG. 5) is disposed a release layer 46 (FIG. 4) or release layers 56 and 56' (FIG. 5). Such film constructions could be used as release articles such as transfer tapes.

In embodiments of film constructions of the present disclosure, a release layer includes one or more polymers including polylactic acid. In certain of such embodiments, particularly those in which the release layer is the outermost layer, the film constructions, and articles incorporating such film constructions, are rendered paintable, printable, or otherwise image receptive due to the presence of the polylactic acid in the release layer. In certain embodiments, a release layer may include polylactic acid as the only polymer (100% polylactic acid). In certain embodiments, a release layer may include a mixture of polymers that includes polylactic acid and, for example, an ethylene-containing copolymer.

In certain embodiments, an optional tie layer of film constructions of the present disclosure (e.g., layer 14 shown in FIG. 1) may also include an ethylene-containing copolymer. In certain embodiments, such ethylene-containing copolymers may include at least one polar comonomer. In certain embodiments, an optional tie layer includes at least two different ethylene-containing copolymers, each including a polar comonomer, which may be the same or different.

A backing of film constructions of the present disclosure may include one or more layers. In certain embodiments, a backing includes an extrudable material. In certain embodiments, an extrudable material includes one or more polyesters (aliphatic or aromatic), polyolefins, thermoplastic elastomers, polyurethanes, or mixtures thereof. In certain embodiments, the polyolefin may be a homopolymer or copolymer, including an ethylene-containing copolymer.

In certain embodiments, a backing of film constructions of the present disclosure includes polylactic acid and an ethylene-containing copolymer including a polar comonomer. Such backing may optionally contain two or more layers. For example, the backing may include one layer that includes polylactic acid (PLA) and an ethylene-containing copolymer including a polar comonomer, and one or more layers that include materials other than a mixture of PLA and an ethylene-containing copolymer.

Typically, such film constructions (i.e., films) are formed by coextruding. For example, a film that includes a backing, a release layer, and a tie layer that bonds or ties the backing and release layer together, are formed by coextruding the backing, release layer, and tie layer.

In certain embodiments, film constructions and articles including such film constructions of the present disclosure are paintable, printable, or otherwise image receptive, particularly on a release layer surface. In certain embodiments, a film construction of the present disclosure possesses paintability on a release layer surface according to the ASTM F1842-15 (2015).

In certain embodiments, a film construction of the present disclosure possesses a release adhesion strength of 10.9 Newtons per decimeter (N/dm) to 54.7 N/dm.

Release Layer

The release layer includes polylactic acid. For film constructions and articles including such film constructions of the present disclosure wherein the release layer is the outermost surface layer, such film constructions and articles are paintable, printable, or otherwise image receptive as a result of the incorporation of polylactic acid.

In certain embodiments, the polymer of the release layer includes 100% polylactic acid. In certain embodiments, the release layer may include a mixture of polymers. In certain embodiments, the polymer of the release layer may also include additional polymers such as other polyesters (other than PLA), polyolefins, polyamides, polycarbonates, polyurethanes, acrylics, or combinations thereof. In certain embodiments, the release layer may further include a polyolefin such as an ethylene-containing copolymer to modify the release adhesion level.

The optional polymers mixed with PLA in the release layer are selected to enhance the releasability, and optionally flexibility, of the release layer, and to not adversely impact the paintability, printability, or otherwise image receptivity of the release layer (due to the presence of the polylactic acid). The optional polymers mixed with PLA in the release layer are also selected to be compatible with the PLA such that there are no microdomains that could provide a hazy release layer. Such optional polymer is referred to herein as a PLA-compatible polymer.

Lactic acid is a renewable material obtained by the bacterial fermentation of corn starch or cane sugar, and thus is considered a natural or in other words "biomass" material. Lactic acid has two optical isomers: L-lactic acid (also known as (S)-lactic acid) and D-lactic acid (also known as (R)-lactic acid), depicted as follows:

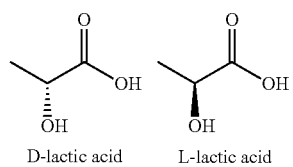

D-lactic acid     L-lactic acid

Polyesterification of lactic acid affords polylactic acid polymer.

More typically, n moles of lactic acid are typically converted to the cyclic lactide monomer, and the lactide undergoes ring opening polymerization, such as depicted as follows (wherein n is at least 2):

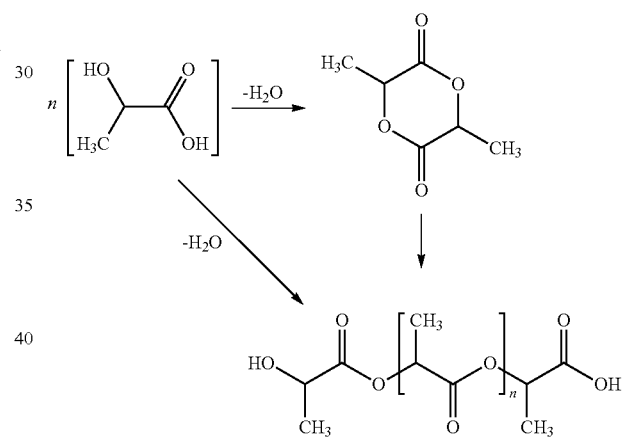

The resulting polymer material is typically referred to as polylactide polymer or polylactic acid polymer or simply polylactic acid (or PLA).

The degree of crystallinity, and hence many important properties, is largely controlled by the ratio of D- and/or meso-lactide to L-cyclic lactide monomers used. Likewise, for polymers prepared by direct polyesterification of lactic acid, the degree of crystallinity is largely controlled by the ratio of polymerized units derived from D-lactic acid to polymerized units derived from L-lactic acid.

The release layer described herein that includes PLA generally includes an amorphous PLA polymer, a semicrystalline PLA polymer, or a combination thereof. Both the semicrystalline and amorphous PLA polymers have differing concentrations of polymerized units derived from L-lactic acid (e.g., L-lactide) and polymerized units derived from D-lactic acid (e.g., D-lactide). Typically, the polylactic acid of the release layer includes at least 1 weight percent (wt-%) D-lactic acid.

Amorphous PLA typically includes up to 90 wt-%, or up to 88 wt-%, or up to 86 wt-% of polymerized units derived from L-lactic acid, and at least 10 wt-%, or at least 12 wt-%, or at least 14 wt-%, of polymerized units derived from D-lactic acid (e.g., D-lactic lactide and/or meso-lactide). In some embodiments, amorphous PLA includes at least 80 wt-%, at least 82 wt-%, at least 84 wt-%, or at least 85 wt-% of polymerized units derived from L-lactic acid (e.g., L-lactide). In some embodiments, amorphous PLA comprises up to 20 wt-%, up to 18 wt-%, up to 16 wt-%, or up to 15 wt-% of polymerized units derived from D-lactic acid (e.g., D-lactide and/or meso-lactide). A suitable amorphous PLA includes INGEO 4060D available from NatureWorks Incorporated. This polymer has been described in the literature to have a molecular weight Mw of 180,000 g/mole.

Semicrystalline PLA polymer typically includes at least 90 wt-%, at least 91 wt-%, at least 92 wt-%, at least 93 wt-%, at least 94 wt-%, or at least 95 wt-% of polymerized units derived from L-lactic acid (e.g., L-lactide), and up to 10 wt-%, up to 9 wt-%, up to 8 wt-%, up to 7 wt-%, up to 6 wt-%, or up to 5 wt-% of polymerized units derived from D-lactic acid (e.g., D-lactide and/or meso-lactide). In yet other embodiments, semicrystalline PLA polymer includes at least 96 wt-%, at least 97 wt-%, or at least 98 wt-% of polymerized units derived from L-lactic acid (e.g., L-lactide), and up to 4 wt-%, up to 3 wt-%, or up to 2 wt-% of polymerized units derived from D-lactic acid (e.g., D-lactide and/or meso-lactide). Suitable examples of semicrystalline PLA include INGEO 4042D and 4032D available from NatureWorks Incorporated. These polymers have been described in the literature as having a weight average molecular weight (Mw) of 200,000 grams per mole (g/mole or g/mol); a number average molecular weight (Mn) of 100,000 g/mole; and a polydispersity of 2.0.

A release layer of film constructions of the present disclosure may include a semicrystalline PLA polymer, an amorphous PLA polymer, or a mixture thereof.

The PLA polymers are preferably "film grade" polymers, having a melt flow rate (as measured according to ASTM D1238) of up to 25 grams per minute (g/min), up to 20 g/min, up to 15 g/min, or up to 10 g/min, at 210° C. with a mass of 2.16 kilograms (kg). In some embodiments, the PLA polymer has a melt flow rate of less than 10 g/min or less than 9 g/min at 210° C. The melt flow rate is related to the molecular weight of the PLA polymer. The PLA polymer typically has a weight average molecular weight (Mw) as determined by Gel Permeation Chromatography with polystyrene standards of at least 50,000 g/mol, at least 75,000 g/mol, at least 100,000 g/mol, at least 125,000 g/mol, or at least 150,000 g/mol. In some embodiments, the molecular weight (Mw) is up to 400,000 g/mol, up to 350,000 g/mol, or up to 300,000 g/mol.

The PLA polymers typically have a tensile strength ranging from 25 megapascals (MPa) to 150 MPa; a tensile modulus ranging from 1000 MPa to 7500 MPa; and a tensile elongation of at least 3%, at least 4%, or at least 5%, ranging up to about 15%. In some embodiments, the tensile strength of the PLA polymer is at least 30 MPa, at least 40 MPa, or at least 50 MPa. In some embodiments, the tensile strength of the PLA polymer is up to 125 MPa, up to 100 MPa, or up to 75 MPa. In some embodiments, the tensile modulus of the PLA polymer is at least 1500 MPa, at least 2000 MPa, or at least 2500 MPa. In some embodiments, the tensile modulus of the PLA polymer is up to 7000 MPa, up to 6500 MPa, up to 6000 MPa, up to 5500 MPa, up to 5000 MPa, or up to 4000 MPa. Such tensile and elongation properties can be determined by ASTM D882 and are typically reported by the manufacturer or supplier of such PLA polymers.

Semicrystalline and amorphous PLA polymers generally have a glass transition temperature, Tg, as can be determined by Differential Scanning calorimetry (DSC) ranging from 50° C. to 65° C. The semicrystalline PLA polymers typically have a melting point ranging from 140° C. to 175° C.

The PLA polymer can typically be melt-processed at temperatures of 180° C., 190° C., 200° C., 210° C., 220° C., or 230° C.

A release layer of the present disclosure typically includes a PLA polymer (amorphous, semicrystalline, or a blend of amorphous and semicrystalline PLA polymers) in a total amount of at least 10 wt-%, at least 15 wt-%, at least 20 wt-%, at least 25 wt-%, at least 30 wt-%, at least 35 wt-%, at least 40 wt-%, at least 45 wt-%, at least 50 wt-%, at least 55 wt-%, at least 60 wt-%, at least 65 wt-%, at least 70 wt-%, at least 75 wt-%, or at least 80 wt-%, based on the total weight of the PLA and optional PLA-compatible polymer(s) such as an ethylene-containing copolymer, or based on the total weight of the release layer. The total amount of PLA polymer is typically up to 100 wt-%, up to 99 wt-%, up to 95 wt-%, up to 90 wt-%, up to 85 wt-%, up to 80 wt-%, up to 75 wt-%, or up to 70 wt-%, based on the total weight of the PLA and optional PLA-compatible polymer(s) such as an ethylene-containing copolymer, or based on the total weight of the release layer.

In certain embodiments, a release layer may include polylactic acid as the only polymer. In certain embodiments, a release layer may include polylactic acid and further include an ethylene-containing copolymer. In certain embodiments, an ethylene-containing copolymer includes a polar comonomer, which means that such copolymer is derived from ethylene and one or more polar comonomers.

In certain embodiments, the polar comomoners are selected such that the ethylene-containing copolymer enhances the releasability, and optionally flexibility, of the release layer and to not adversely impact the paintability, printability, or otherwise image receptivity of the release layer (due to the presence of the polylactic acid). In certain embodiments, the polar comomoners are also selected such that the ethylene-containing copolymer is compatible with the PLA such that there are no microdomains that could provide a hazy release layer.

In certain embodiments, examples of ethylene-containing copolymers include an ethylene-containing copolymer including two or more polar comonomers, such as carbon monoxide modified ethylene/vinyl acetate. In certain embodiments, examples of ethylene-containing copolymers include an ethylene-(meth)acrylate ester copolymer. Mixtures of ethylene-containing copolymers may also be included in release layers of the present disclosure.

Suitable PLA-compatible polymers, such as ethylene-containing copolymers, may have a melt flow index according to ASTM D1238 of at least 1 g/10 min, at least 2 g/10 min, at least 5 g/10 min, or at least 10 g/10 min. In some embodiments, the melt flow index of suitable PLA-compatible polymers, such as ethylene-containing copolymers, is up to 100 g/10 min, up to 80 g/10 min, up to 60 g/10 min, or up to 40 g/10 min at 210° C. with a mass of 2.16 kilograms (kg).

In certain embodiments, an ethylene-containing copolymer of a release layer includes at least 70 wt-%, at least 75 wt-%, or at least 80 wt-%, of ethylene. In certain embodiments, an ethylene-containing copolymer of a release layer includes up to 99 wt-%, up to 95 wt-%, up to 90 wt-%, or up to 85 wt-%, of ethylene.

In certain embodiments, an ethylene-containing copolymer of a release layer includes one or more polar comonomers. In certain embodiments, such copolymers include at least 1 wt-%, at least 5 wt-%, at least 10 wt-%, or at least 15 wt-%, of one or more polar comonomers. In certain embodiments, such copolymers include up to 30 wt-%, up to 25 wt-%, or up to 20 wt-%, of one or more polar comonomers.

Examples of ethylene-containing copolymers including a polar comonomer include ethylene/acrylic acid, ethylene/methacrylic acid, and the like. Ethylene/acrylic acid copolymers are available from various suppliers such as Dow under the trade designation PRIMACOR 1410 or 3460. Ethylene/methacrylic acid copolymers are available from various suppliers such as DuPont Packaging and Industrial Polymers under the trade designations NUCREL 0403 and 0903. Such copolymers are also referred to as ethylene-(meth)acrylate ester copolymers.

In certain embodiments, the ethylene-containing copolymer including a polar comonomer is an ethylene-containing copolymer containing two or more polar comonomers. Examples of such ethylene-containing copolymers include carbon monoxide modified ethylene/vinyl acetate or anhydride modified ethylene/vinyl acetate. Such ethylene-containing copolymers are commercially available from various suppliers including DuPont Packaging and Industrial Polymers under the trade designations BYNEL E418 and ELVALOY 741.

In certain embodiments, the release layer may contain a mixture of at least two different ethylene-containing copolymers. In certain embodiments, the at least two different ethylene-containing copolymers may include the same or different polar comonomers. In certain embodiments, the at least two different ethylene-containing copolymers may include different polar comonomers. In certain embodiments, the at least two different ethylene-containing copolymers may each independently include the same polar comonomers but with different polar comonomer levels.

In certain embodiments, the release layer includes a total amount of at least 1 wt-%, at least 2 wt-%, at least 3 wt-%, at least 4 wt-%, or at least 5 wt-%, of an optional PLA-compatible polymer such as an ethylene-containing copolymer, based on the total weight of the PLA and optional PLA-compatible polymer(s) such as an ethylene-containing copolymer, or based on the total weight of the release layer. In certain embodiments, the release layer includes a total amount of up to 90 wt-%, up to 85 wt-%, or up to 80 wt-%, of an optional PLA-compatible polymer such as an ethylene-containing copolymer, based on the total weight of the PLA and optional PLA-compatible polymer(s) such as an ethylene-containing copolymer, or based on the total weight of the release layer.

In certain embodiments, a release layer may include optional additives such as UV stabilizers, fillers, colorants, and the like.

Backing

A backing is part of certain embodiments of film constructions of the present disclosure. A backing of film constructions of the present disclosure may include one or more layers.

In certain embodiments, a backing layer includes an extrudable material. In certain embodiments, an extrudable material includes one or more polyesters (aliphatic or aromatic), polyolefins, thermoplastic elastomers, polyurethanes, or mixtures thereof. Such polymers may be homopolymers or copolymers.

Suitable polymers for a backing layer may have a melt flow index according to ASTM D1238 of at least 1 g/10 min, at least 2 g/10 min, at least 5 g/10 min, or at least 10 g/10 min. In some embodiments, the melt flow index is up to 100 g/10 min, up to 80 g/10 min, up to 60 g/10 min, or up to 40 g/10 min at 210° C. with a mass of 2.16 kilograms (kg).

In certain embodiments, at least one backing layer includes a polyolefin homopolymer. In certain embodiments, such polyolefin homopolymer includes a low density polyethylene.

In certain embodiments, at least one backing layer includes a polyolefin copolymer. In certain embodiments, such polyolefin copolymer includes an ethylene-containing copolymer. The ethylene-containing copolymer typically includes a polar comonomer.

In certain embodiments, at least one backing layer includes a polyester. In certain embodiments, such polyester includes aliphatic polyesters and aromatic polyesters. In certain embodiments, such polyester includes polylactic acid.

In certain embodiments, the backing layer includes polylactic acid and another polymer mixed with the polylactic acid. In certain embodiments, the other polymer is typically selected to combine with the PLA to provide flexibility and tearability to the backing. In certain embodiments, the other polymer is also selected to be compatible with the PLA such that there are no microdomains that could provide a hazy backing layer. Such other polymer is referred to herein as a PLA-compatible polymer.

In certain embodiments, at least one backing layer includes polylactic acid and an ethylene-containing copolymer. In certain embodiments, at least one backing layer includes polylactic acid and an ethylene-containing copolymer including a polar comonomer. In certain embodiments, a backing of the present disclosure includes at least one backing layer that includes a mixture of at least polylactic acid ("PLA" or polylactic acid polymer) and an ethylene-containing copolymer. In certain embodiments, a backing of the present disclosure includes at least one backing layer that includes a mixture of at least polylactic acid and an ethylene-containing copolymer including a polar comonomer.

In certain embodiments, all the layers of the backing include such mixtures of PLA and ethylene-containing copolymers. Typically, PLA alone is stiff and brittle, and an ethylene-containing copolymer such as ethylene/vinyl acetate elongates upon tearing. Together, however, the combination provides good properties for a hand-tearable tape.

The backing may also include optional layers including other materials such as 100 wt-% PLA, 100 wt-% of one or more ethylene-containing copolymers, as well as layers that include polyurethanes, polyesters, polyamides, polyolefins (e.g., polyethylene, polypropylene), and combinations thereof. Such optional layers may be employed so long as the film retains its desirable properties, such as desirable tearability characteristics and internal cohesive integrity (e.g., does not suffer from delamination during manufacture or use).

The PLA polymer, typically an amorphous PLA alone or in combination with a semicrystalline PLA polymer can be melt-processed at temperatures of 180° C., 190° C., 200° C., 210° C., 220° C., or 230° C.

A backing layer of the present disclosure typically includes an amorphous PLA polymer or a blend of amorphous and semicrystalline PLA polymers in a total amount of at least 40 wt-%, at least 45 wt-%, at least 50 wt-%, at least 55 wt-%, at least 60 wt-%, at least 65 wt-%, at least 70 wt-%, at least 75 wt-%, or at least 80 wt-%, based on the total weight of the PLA and a PLA-compatible polymer such as an ethylene-containing copolymer. The total amount of PLA polymer of a backing layer is typically up to 99 wt-%, up to 95 wt-%, up to 90 wt-%, up to 85 wt-%, up to 80 wt-%, up to 75 wt-%, or up to 70 wt-%, based on the total weight of the PLA and a PLA-compatible polymer such as an ethylene-containing copolymer.

When the composition of a backing layer includes a blend of amorphous and semicrystalline PLA, the amount of amorphous PLA is typically at least 10 wt-%, at least 15 wt-%, or at least 20 wt-%, based on the total weight of the PLA polymer and a PLA-compatible polymer such as an ethylene-containing copolymer. In some embodiments, the amount of semicrystalline PLA polymer ranges from at least 10 wt-%, at least 15 wt-%, at least 25 wt-%, or at least 30 wt-%, and up to 60 wt-%, up to 55 wt-%, or up to 50 wt-%, based on the total weight of the PLA polymer and a PLA-compatible polymer such as an ethylene-containing copolymer. The amount of amorphous PLA polymer of a backing layer is typically greater than the amount of semicrystalline polymer.

In certain embodiments, a backing layer also includes an ethylene-containing copolymer. In certain embodiments, a backing layer also includes an ethylene-containing copolymer including a polar comonomer. In certain embodiments, an ethylene-containing copolymer, particularly an ethylene-containing copolymer that includes a polar comonomer, is typically selected to combine with the PLA to provide flexibility and tearability to the backing. In certain embodiments, an ethylene-containing copolymer is also selected to be compatible with the PLA such that there are no microdomains that could provide a hazy backing layer.

In certain embodiments, the ethylene-containing copolymer of a backing layer includes at least 70 wt-%, at least 75 wt-%, or at least 80 wt-%, of ethylene. In certain embodiments, the ethylene-containing copolymer of a backing layer includes up to 99 wt-%, up to 95 wt-%, up to 90 wt-%, or up to 85 wt-%, of ethylene.

In certain embodiments, the ethylene-containing copolymer of a backing layer includes a polar comonomer. In certain embodiments, the ethylene-containing copolymer of a backing layer includes at least 1 wt-%, at least 5 wt-%, at least 10 wt-%, or at least 15 wt-%, of one or more polar comonomers. In certain embodiments, the ethylene-containing copolymer of a backing layer includes up to 30 wt-%, up to 25 wt-%, or up to 20 wt-%, of one or more polar comonomers.

Examples of ethylene-containing copolymers including a polar comonomer include ethylene/vinyl acetate, ethylene/acrylic acid, ethylene/methacrylic acid, and the like. Ethylene/vinyl acetate copolymers are commercially available from various suppliers including DuPont Packaging and Industrial Polymers under the trade designations ELVAX 750, 550, and 350. Ethylene/acrylic acid copolymers are available from various suppliers such as Dow under the trade designation PRIMACOR 1410 or 3460. Ethylene/methacrylic acid copolymers are available from various suppliers such as DuPont Packaging and Industrial Polymers under the trade designations NUCREL 0403 and 0903.

In certain embodiments of a backing layer, the ethylene-containing copolymer including a polar comonomer is an ethylene-containing copolymer containing two or more polar comonomers. Examples of such ethylene-containing copolymers include carbon monoxide modified ethylene/vinyl acetate or anhydride modified ethylene/vinyl acetate. Such ethylene-containing copolymers are commercially available from various suppliers including DuPont Packaging and Industrial Polymers under the trade designations BYNEL E418 and ELVALOY 741.

In certain embodiments, a backing layer may contain a mixture of at least two different ethylene-containing copolymers. In certain embodiments of a backing layer, the at least two different ethylene-containing copolymers may each independently include different polar comonomers. In certain embodiments of a backing layer, the at least two different ethylene-containing copolymers may each independently include the same polar comonomers but with different polar comonomer levels.

In certain embodiments, at least one backing layer includes a total amount of at least 1 wt-%, at least 2 wt-%, at least 3 wt-%, at least 4 wt-%, or at least 5 wt-%, of a PLA-compatible polymer such as an ethylene-containing copolymer, particularly an ethylene-containing copolymer including a polar comonomer, based on the total weight of PLA and the PLA-compatible polymer such as an ethylene-containing copolymer. In certain embodiments of the at least one backing layer includes a total amount of up to 20 wt-%, up to 15 wt-%, or up to 10 wt-%, of a PLA-compatible polymer such as an ethylene-containing copolymer, particularly an ethylene-containing copolymer including a polar comonomer, based on the total weight of PLA and the PLA-compatible polymer such as an ethylene-containing copolymer.

In certain embodiments, a backing layer may include optional additives such as UV stabilizers, fillers, colorants, and the like.

Tie Layer

A film construction of the present disclosure optionally includes a layer that ties the release layer to the backing and/or a layer that ties the adhesive layer to the backing.

In certain embodiments, a tie layer includes an ethylene-containing copolymer. In certain embodiments, a tie layer includes an ethylene-containing copolymer including a polar comonomer. Such copolymers may have a melt flow index according to ASTM D1238 of at least 1 g/10 min, at least 2 g/10 min, at least 5 g/10 min or at least 10 g/10 min. In some embodiments, the melt flow index is up to 100 g/10 min, up to 80 g/10 min, up to 60 g/10 min, or up to 40 g/10 min at 210° C. with a mass of 2.16 kilograms (kg).

In certain embodiments, the ethylene-containing copolymer of the tie layer includes at least 70 wt-%, at least 75 wt-%, or at least 80 wt-%, of ethylene. In certain embodiments, the ethylene-containing copolymer of the tie layer includes up to 99 wt-%, up to 95 wt-%, up to 90 wt-%, or up to 85 wt-%, of ethylene.

In certain embodiments, the ethylene-containing copolymer of the tie layer includes a polar comonomer. In certain embodiments, the ethylene-containing copolymer of the tie layer includes at least 1 wt-%, at least 5 wt-%, at least 10 wt-%, or at least 15 wt-%, of one or more polar comonomers. In certain embodiments, the ethylene-containing copolymer of the tie layer includes up to 30 wt-%, up to 25 wt-%, or up to 20 wt-%, of one or more polar comonomers.

Examples of ethylene-containing copolymers including a polar comonomer include ethylene/vinyl acetate, ethylene/acrylic acid, and ethylene/methacrylic acid and the like.

Ethylene/vinyl acetate copolymers are commercially available from various suppliers including DuPont Packaging and Industrial Polymers under the trade designations ELVAX 750, 550, and 350. Ethylene/acrylic acid copolymers are available from various suppliers such as Dow under the trade designations PRIMACOR 1410 and 3460. Ethylene/methacrylic acid copolymers are available from various suppliers such as DuPont Packaging and Industrial Polymers under the trade designations NUCREL 0403 and 0903.

In certain embodiments, the ethylene-containing copolymer including a polar comonomer is an ethylene-containing copolymer that includes two or more polar comonomers. Examples of such ethylene-containing copolymers include carbon monoxide modified ethylene/vinyl acetate or anhydride modified ethylene/vinyl acetate. Such ethylene-containing copolymers are commercially available from various suppliers including DuPont Packaging and Industrial Polymers under the trade designations BYNEL E418 and ELVALOY 741.

In certain embodiments, the tie layer may contain a mixture of at least two different ethylene-containing copolymers. In certain embodiments of a tie layer, the at least two different ethylene-containing copolymers may include the same or different polar comonomers. In certain embodiments of a tie layer, the at least two different ethylene-containing copolymers may include different polar comonomers. In certain embodiments of a tie layer, the at least two different ethylene-containing copolymers may each independently include the same polar comonomers but with different polar comonomer levels.

In certain embodiments, a tie layer may include optional additives such as UV stabilizers, fillers, colorants, and the like.

In certain embodiments, each of a backing layer, tie layer, and release layer include an ethylene-containing copolymer. In such embodiments, the ethylene-containing copolymers of each layer may or may not be the same.

Articles

Articles are provided that include film constructions of the present disclosure. In certain embodiments, the article is a tape wherein an adhesive layer is disposed on a backing (typically the second major surface of the backing such as disclosed in FIG. 1). In certain embodiments, such article is a paintable tape. Such tapes could be useful as a masking tape, box sealing tape, bundling tape, medical tape, and other tapes known to those skilled in the art.

In certain embodiments, the article is a tape wherein an adhesive layer is disposed on a backing and a release layer is disposed on an adhesive layer (see, e.g., FIG. 2).

In certain embodiments, the article is a release article. Such release articles include an adhesive layer having a first major surface and a second major surface; and a release layer disposed on the first major surface of the adhesive layer, wherein the release layer comprises polylactic acid.

In certain embodiments, the article is a release article wherein a release layer is disposed between a backing and an adhesive layer (see, e.g., FIG. 3). In certain embodiments, the article is a release article wherein a release layer is disposed on one major surface of an adhesive layer (see, e.g., FIG. 4). In certain embodiments, the article is a release article wherein a release layer is disposed on both major surfaces of an adhesive layer (see, e.g., FIG. 5).

In certain embodiments, the adhesive layer includes a pressure sensitive adhesive. The adhesive may be applied by traditional coating methods, such as by solvent, water-based, transfer lamination, or hot melt extrusion or coextrusion. Examples of pressure sensitive adhesives include, but are not limited to, rubbers based on isoprene, butyl, isobutylene; synthetic rubbers (e.g., those based on styrene block copolymers); acrylates; silicones; and vinyl ethers.

In certain embodiments of a release articles, an adhesive layer may be disposed between two different release layers (see, e.g., FIG. 5). Alternatively, one major surface of an adhesive layer may have a release layer disposed thereon (see, e.g., FIG. 4) and the other major surface of the adhesive layer may be treated to have a differential release surface. Alternatively, one major surface of an adhesive layer may have a release layer disposed thereon (see, e.g., FIG. 4) and the release layer surface opposite that of the adhesive layer may be treated to have a differential release surface. These allow for differential release of the adhesive when the article is wound on itself.

A second release layer may include a silicone (e.g., a polyalkyl siloxane), a fluorochemical, an alpha-olefin homo- or co-polymer, such as those prepared using a metallocene catalyst, or an ethylene bis-stearamide wax (e.g., that available under the tradename AKROWAX EBS 290 available from Akrochem Corp., Akron, Ohio).

In certain embodiments, a second release layer includes a polyalkyl siloxane. In certain embodiments, a polyalkyl siloxane has a structure that includes:

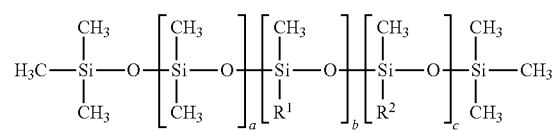

wherein:
the sum of (a+b+c) is from 100 to 1000;
the ratio of a to the sum of (b+c) is from 98:2 to 94:6;
$R^1$ is a linear, branched, or cyclic alkyl group having from 20 to 50 carbon atoms; and
$R^2$ is a linear, branched, or cyclic alkyl or alkaryl group having from 6 to 10 carbon atoms.

In certain embodiments, a second release layer includes a polyolefin. Examples of polyolefins include polyethylene, polypropylene, poly-alpha-olefins, and copolymers thereof, including low density polyethylene (LDPE), high density polyethylene (HDPE), linear low density polyethylene (LLDPE), ultra-high density polyethylene (UHDPE), and poly-ethylene-polypropylene copolymers. Polyolefins are commercially available from various suppliers including Equistar Chemicals, LP of LyondellBasell Holdings under the trade designation PETROTHENE.

In certain embodiments, a second release layer includes materials as described in U.S. Pat. No. 6,919,405 (Kinning et al.) and U.S. Pat. No. 9,187,678 (Boardman et al.).

In certain embodiments, a differential release surface can be provided by a series of eight release agent solutions and emulsions for pressure sensitive adhesive tapes that are disclosed at https://www.pstc.org/files/public/Shores.pdf (Andrew Shores, "SECOND GENERATION RELEASE AGENTS: AQUEOUS AND FAST DRYING", Hitac Adhesives and Coatings, Inc. Venice, Calif.). In certain embodiments, a differential release surface can be provided by release coating formulations described in U.S. Pat. No. 6,541,109 (Kumar et al.), U.S. Pat. No. 7,682,771 (Liu et al.), and U.S. Pat. No. 7,411,020 (Carlson et al.).

ILLUSTRATIVE EMBODIMENTS

Embodiment 1 is a film construction comprising: a backing having a first major surface and a second major surface; and a release layer disposed on the first major surface of the backing, wherein the release layer comprises polylactic acid.

Embodiment 2 is the film construction of embodiment 1 wherein the release layer comprises a polymer comprising 100% polylactic acid.

Embodiment 3 is the film construction of embodiment 1 wherein the release layer comprises a mixture of polymers.

Embodiment 4 is the film construction of embodiment 3 wherein the mixture of polymers comprises polylactic acid and another polyester, a polyolefin, a polyamide, a polycarbonate, a polyurethane, an acrylic, or combinations thereof.

Embodiment 5 is the film construction of embodiment 4 wherein the mixture of polymers comprises polylactic acid and a polyolefin.

Embodiment 6 is the film construction of embodiment 5 wherein the polyolefin comprises an ethylene-containing copolymer.

Embodiment 7 is the film construction of embodiment 6 wherein the ethylene-containing copolymer comprises ethylene and at least one polar comonomer.

Embodiment 8 is the film construction of embodiment 7 wherein the at least one polar comonomer is selected such that the ethylene-containing copolymer enhances the releasability, and optionally flexibility, of the release layer.

Embodiment 9 is the film construction of embodiment 7 or 8 wherein the at least one polar comonomer is selected such that the ethylene-containing copolymer does not adversely impact the paintability, printability, or otherwise image receptivity of the release layer (due to the presence of the polylactic acid).

Embodiment 10 is the film construction of any one of embodiments 7 through 9 wherein the ethylene-containing copolymer comprises ethylene and at least two polar comonomers.

Embodiment 11 is the film construction of embodiment 10 comprises carbon monoxide modified ethylene/vinyl acetate.

Embodiment 12 is the film construction of any one of embodiments 7 through 9 wherein the ethylene-containing copolymer comprises an ethylene-(meth)acrylate ester copolymer.

Embodiment 13 is the film construction of any one of embodiments 7 through 12 wherein the ethylene-containing copolymer comprises an ethylene-(meth)acrylate ester copolymer, carbon monoxide modified ethylene/vinyl acetate, or a mixture thereof.

Embodiment 14 is the film construction of any one of embodiments 1 through 13 wherein the release layer is disposed directly on the backing.

Embodiment 15 is the film construction of any one of embodiments 1 through 13 further comprising a tie layer disposed on the first major surface of the backing, wherein the release layer is disposed on the tie layer.

Embodiment 16 is the film construction of embodiment 15 wherein the tie layer comprises an ethylene-containing copolymer.

Embodiment 17 is the film construction of embodiment 16 wherein the tie layer comprises an ethylene-containing copolymer comprising at least one polar comonomer.

Embodiment 18 is the film construction of embodiment 17 wherein the tie layer comprises at least two different ethylene-containing copolymers, each comprising a polar comonomer that may or may not be the same.

Embodiment 19 is the film construction of any one of embodiments 1 through 18 wherein the backing comprises one or more layers.

Embodiment 20 is the film construction of embodiment 19 wherein the backing comprises at least one backing layer comprising an extrudable material.

Embodiment 21 is the film construction of embodiment 20 wherein the extrudable material comprises a polyester, a polyolefin, a thermoplastic elastomer, a polyurethane, or a mixture thereof.

Embodiment 22 is the film construction of embodiment 21 wherein the backing comprises at least one backing layer comprising polylactic acid.

Embodiment 23 is the film construction of embodiment 20 or 21 wherein the backing comprises at least one backing layer comprising a polyolefin.

Embodiment 24 is the film construction of embodiment 23 wherein the polyolefin comprises a low density polyethylene.

Embodiment 25 is the film construction of embodiment 22 or 23 wherein the backing comprises at least one backing layer comprising polylactic acid and an ethylene-containing copolymer.

Embodiment 26 is the film construction of embodiment 25 wherein the backing comprises at least one backing layer comprising polylactic acid and an ethylene-containing copolymer comprising a polar comonomer.

Embodiment 27 is the film construction of any one of embodiments 22 through 26 wherein the polylactic acid of at least one backing layer comprises amorphous polylactic acid alone or in combination with semicrystalline polylactic acid.

Embodiment 28 is the film construction of any one of embodiments 1 through 27 wherein the polylactic acid of the release layer comprises amorphous polylactic acid, semicrystalline polylactic acid, or a mixture thereof.

Embodiment 29 is the film construction of any one of embodiments 1 through 28 wherein the amount of polylactic acid in the release layer is at least 10 wt-%, based on the total weight of the release layer.

Embodiment 30 is the film construction of any one of embodiments 1 through 29 wherein the amount of polylactic acid in the release layer is up to 100 wt-%, based on the total weight of the release layer.

Embodiment 31 is the film construction of any one of embodiments 1 through 30 which possesses a release adhesion strength of 10.9 N/dm to 54.7 N/dm.

Embodiment 32 is the film construction of any one of embodiments 1 through 31 which is paintable, printable, or otherwise image receptive.

Embodiment 33 is an article comprising: a film construction of any one of embodiments 1 through 32; and an adhesive layer disposed on the second major surface of the backing.

Embodiment 34 is a film construction comprising: an adhesive layer having a first major surface and a second major surface; and a release layer disposed on the first major surface of the adhesive layer, wherein the release layer comprises polylactic acid.

Embodiment 35 is the film construction of embodiment 34 wherein the second major surface of the adhesive layer has a second release layer disposed thereon.

Embodiment 36 is the film construction of embodiment 35 wherein the second release layer comprises a silicone, a fluorochemical, an alpha-olefin homo- or co-polymer, or an ethylene bis-stearamide wax.

Embodiment 37 is the film construction of embodiment 34 wherein the second major surface of the adhesive layer is disposed on a backing.

Embodiment 38 is the film construction of embodiment 34 wherein the release layer is disposed between the adhesive layer and a backing.

Embodiment 39 is the film construction of embodiment 37 or 38 wherein the backing comprises one or more layers.

Embodiment 40 is the film construction of any one of embodiments 37 through 39 wherein the backing comprises at least one backing layer comprising an extrudable material.

Embodiment 41 is the film construction of embodiment 40 wherein the extrudable material comprises a polyester, a polyolefin, a thermoplastic elastomer, a polyurethane, or a mixture thereof.

Embodiment 42 is the film construction of embodiment 41 wherein the backing comprises at least one backing layer comprising polylactic acid.

Embodiment 43 is the film construction of embodiment 41 or 42 wherein the backing comprises at least one backing layer comprising a polyolefin.

Embodiment 44 is the film construction of embodiment 43 wherein the polyolefin comprises a low density polyethylene.

Embodiment 45 is the film construction of embodiment 41 or 42 wherein the backing comprises at least one backing layer comprising polylactic acid and an ethylene-containing copolymer.

Embodiment 46 is the film construction of embodiment 45 wherein the backing comprises at least one backing layer comprising polylactic acid and an ethylene-containing copolymer comprising a polar comonomer.

Embodiment 47 is the film construction of any one of embodiments 42 through 46 wherein the polylactic acid of at least one backing layer comprises amorphous polylactic acid alone or in combination with semicrystalline polylactic acid.

Embodiment 48 is the film construction of any one of embodiments 34 through 47 wherein the release layer comprises a polymer comprising 100% polylactic acid.

Embodiment 49 is the film construction of any one of embodiments 34 through 47 wherein the release layer comprises a mixture of polymers.

Embodiment 50 is the film construction of embodiment 49 wherein the mixture of polymers comprises polylactic acid and another polyester, a polyolefin, a polyamide, a polycarbonate, a polyurethane, an acrylic, or combinations thereof.

Embodiment 51 is the film construction of embodiment 50 wherein the mixture of polymers comprises polylactic acid and a polyolefin.

Embodiment 52 is the film construction of embodiment 51 wherein the polyolefin comprises an ethylene-containing copolymer.

Embodiment 53 is the film construction of embodiment 52 wherein the ethylene-containing copolymer comprises ethylene and at least one polar comonomer.

Embodiment 54 is the film construction of embodiment 53 wherein the at least one polar comonomer is selected such that the ethylene-containing copolymer enhances the releasability, and optionally flexibility, of the release layer.

Embodiment 55 is the film construction of embodiment 53 or 54 wherein the at least one polar comonomer is selected such that the ethylene-containing copolymer does not adversely impact the paintability, printability, or otherwise image receptivity of the release layer (due to the presence of the polylactic acid).

Embodiment 56 is the film construction of any one of embodiments 52 through 55 wherein the ethylene-containing copolymer comprises ethylene and at least two polar comonomers.

Embodiment 57 is the film construction of embodiment 56 comprises carbon monoxide modified ethylene/vinyl acetate.

Embodiment 58 is the film construction of any one of embodiments 52 through 55 wherein the ethylene-containing copolymer comprises an ethylene-(meth)acrylate ester copolymer.

Embodiment 59 is the film construction of any one of embodiments 52 through 58 wherein the ethylene-containing copolymer comprises an ethylene-(meth)acrylate ester copolymer, carbon monoxide modified ethylene/vinyl acetate, or a mixture thereof.

Embodiment 60 is the film construction of any one of embodiments 34 through 59 wherein the amount of polylactic acid in the release layer is at least 10 wt-%, based on the total weight of the release layer.

Embodiment 61 is the film construction of any one of embodiments 34 through 60 wherein the amount of polylactic acid in the release layer is up to 100 wt-%, based on the total weight of the release layer.

Embodiment 62 is the film construction of any one of embodiments 34 through 61 which possesses a release adhesion strength of 10.9 N/dm to 54.7 N/dm.

Embodiment 63 is the film construction of any one of embodiments 34 through 62 which is paintable, printable, or otherwise image receptive.

EXAMPLES

Objects and advantages of various embodiments of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims.

Materials

| Designation | Description |
|---|---|
| PLA1 | An amorphous polylactic acid resin having a density of 1.24 grams/cubic centimeter, a glass transition temperature of 55-60° C., and a refractive index of 1.455, available under the trade designation INGEO BIOPOLYMER 4060D from NatureWorks LLC, Minnetonka, MN. |
| PLA2 | A semi-crystalline polylactic acid resin having a density of 1.24 grams/cubic centimeter and a melting point of 155-170° C., available under the trade designation INGEO BIOPOLYMER 4032D from NatureWorks LLC, Minnetonka, MN. |
| EMA | A copolymer of ethylene and methyl acrylate having a density of 0.93 grams/cubic centimeter, a Vicat softening point of 70° C., a melting poingt of 101° C., 9 wt % of methyl acrylate, and a melt flow rate of 6 grams/10 minutes at 190° C. and 2.16 kilograms, available under the trade designation ELVALOY AC 1609 from DuPont Packaging & Industrial Polymers, Wilmington, DE. |
| EVA1 | An ethylene/vinyl acetate/carbon monoxide (E/VA/CO) copolymer having a density of 1.0 grams/cubic centimeter, a glass transition temperature of −36° C., a melting point of 70° C., 8 wt % of carbon monoxide, 20 wt % of vinyl acetate content, and a melt flow rate of 15 grams/10 minutes at 190° C. and 2.16 kilograms, available under the trade designation ELVALOY 4924 from DuPont Packaging & Industrial Polymers, Wilmington, DE. |
| EVA2 | An ethylene/vinyl acetate/carbon monoxide copolymer having a density of 1.0 grams/cubic centimeter, a glass transition temperature of −32° C., a melting point of 66° C., 10 wt % of carbon monoxide, 24 wt % of vinyl acetate, and a melt flow rate of 35 grams/10 minutes at 190° C. and 2.16 kilograms, available under the trade designation ELVALOY 741 from DuPont Packaging and Industrial Polymers, Wilmington, DE. |
| EVA3 | An acid/acrylate-modified ethylene/vinyl acetate polymer having a density of 0.943 grams/cubic centimeter, a Vicat softening point of 65° C., a melting point of 87° C.,18 wt % of vinyl acetate, and a melt flow rate of 3.2 grams/10 |

| Designation | Description |
|---|---|
| | minutes at 190° C. and 2.16 kilograms, available under the trade designation BYNEL 3101 from DuPont Packaging and Industrial Polymers, Wilmington, DE. |
| EVA4 | An ethylene/vinyl acetate copolymer having 6 wt % of vinyl acetate content, a density of 0.925 grams/cubic centimeter, and a melt flow rate of 2.0 grams/10 minutes at 190° C. and 2.16 kilograms, available under the trade designation ELEVATE EF446 from Westlake Chemical Corporation, Houston, TX. |
| EAA | An ethylene/acrylic acid copolymer having a density of 0.938 grams/cubic centimeter, an acrylic acid content of 9.7 wt %, and a melt flow rate of 20 grams/10 minutes at 190° C. and 2.16 kilograms, available under the trade designation PRIMACOR 3460 COPOLYMER from Dow Chemical Company, Midland, MI. |
| LDPE | A low density polyethylene resin having a density of 0.923 gram/cubic centimeter, a Vicat softening point of 92° C., and a melt flow rate of 5.6 grams/10 minutes at 190° C. and 2.16 kilograms, available under the trade designation PETROTHENE NA217000 from LyondellBasell, Houston, TX. |
| TPO | A thermoplastic polyolefin resin having a density of 0.89 grams/cubic centimeter, a Vicat softening point of 58° C., a melting point of 163° C., and a melt flow rate of 7.5 grams/10 minutes at 230° C. and 2.16 kilograms, available under the trade designation ADFLEX X 500 F from LyondellBasell, Houston, TX. |
| TPE | A thermoplastic polyester elastomer having a density of 1.16 grams/cubic centimeter and a melt flow rate of 7.0 grams/10 minutes at 190° C. and 2.16 kilograms, available under the trade designation SKYPEL G140D from SK Chemicals America Inc, Irvine, CA. |
| OMS | For the preparation of the olefin-modified silicone (OMS), see U.S. Pat. No. 9,187,678, Table 3, Example 7 and Column 11, lines 24-29. |
| P-77 | A masterbatch containing polyvinyl octadecyl carbamate:linear low density polyethylene (LLDPE)/20:80 (wt/wt) and having a melting point of 87-107° C., available under the trade designation ESCOAT P-77 from Mayzo, Incorporated, Suwanee, GA. |
| BS | A masterbatch containing low density polyethylene (LDPE):bis-stearamide/95:5 (wt/wt) having a density of 0.92 grams/cubic centimeter and a melt flow rate of 2.0 grams/10 minutes at 190° C. and 2.16 kilograms, available under the trade designation 100666 PE RELEASE MB from Ampacet Corporation, Tarrytown, NY. |
| Adhesive 1 | A high performance acrylic adhesive having a thickness of 0.0023 inch (58 micrometers), available as an adhesive transfer tape under the trade designation 3M High Performance Adhesive Transfer Tape 467MP with 3M Adhesive 200MP, from 3M Company, St. Paul, MN. |
| NR | A smoked, ribbed natural rubber available under the trade designation NATURAL RUBBER SMR-L from Kerilla Rubber, Malaysia. |
| K911 | A French Process zinc oxide as defined by ASTM D-4295 having a density of 5.6 grams/cubic centimeter, a specific surface of 9.0 square meters/gram, and a mean surface particle diameter of 0.12 micrometers, available under the trade designation KADOX 911 from Horsehead Corporation, Monaca, PA. |
| I800 | A heat stabilizer in combination with a phenolic antioxidant having a density of 1.04 grams/cubic centimeter, a melting range of 39-41° C., and a flash point of 219° C., available under the trade designation IRGANOX PS 800 FL from BASF Corporation, Florham Park, NJ. |
| WSL | A polyphenolic antioxidant having a density of 1.1 grams/cubic centimeter, an average particle size of 10 micrometers, a melting point of 115° C., and an ash content of 0.10%, available under the trade designation WINGSTAY L from Omnova Solutions, Fairlawn, OH. |
| E1304 | An aliphatic hydrocarbon resin having a softening point of 100° C., a melt viscosity of 1300 centipoise at 160° C., a number average molecular weight of 1300 grams/mole, and a glass transition temperature of 53° C., available under the trade designation ESCOREZ 1304 from ExxonMobil, Irving, TX. |
| ZN9 | A zinc resinate with a high zinc content having a viscosity of 17 centipoise at 20° C., 9 wt % of zinc, 0.5 wt % of calcium, and a maximum acid value of 5 milligrams KOH/gram, available under the trade designation ZINCOGRAL ZN9 from Parchem Fine & Specialty Chemicals, New Rochelle, NY. |
| VT3 | A low molecular weight alkyl phenol disulfide oligomer having a density of 1.2 grams/cubic centimeter, 27-29 wt % of sulfur, and a softening point of 78-98° C., available under the trade designation VULTAC 3 from Arkema Inc., Philadelphia, PA. |

Test Methods

All samples were conditioned in a constant temperature/humidity room at 25° C. (73° F.) and humidity (50% relative humidity) for at least 24 hours before testing unless otherwise noted.

Release Adhesion Strength

The 180 degree angle release adhesion strength of a release film from an adhesive sample was measured in the following manner. SCOTCH BOX SEALING TAPE 311 or 3M PERFORMANCE YELLOW MASKING TAPE 301+ (both available from 3M Company, St. Paul, Minn.) measuring approximately 2.5 centimeters (1 inch) wide and approximately 20.3 centimeters (8 inches) long, was applied to the release film such that the adhesive layer of the tape contacted the release layer of the release film, rolled down back and forth twice in each direction using a 2 kilogram (4.5 pound) rubber roller such that approximately 12.7 centimeters (5 inches) length of the tape was in contact with the film. Two sets of laminates were created for each test tape. One set of laminates was then conditioned in a constant temperature/humidity room at 25° C. (73° F.) and humidity (50% relative humidity) for 24 hours before testing and the other was aged for 7 days at 23° C. and 50% relative humidity prior to testing for release adhesion strength.

For testing, a double sided foam tape 3M DOUBLE COATED URETHANE FOAM TAPE 4008 (available from 3M Company, St. Paul, Minn.) measuring approximately 5 centimeters (2 inches) wide and approximately 20.3 centimeters (8 inches) long was applied to the platen of a Model 5900 Instron Mechanical Tester (available from Illinois Tool Works Incorporated, Glenview, Ill.). The release film/tape laminate was then applied to the exposed surface of the double sided foam tape such that the backing layer of the release film contacted the foam surface. The samples were then rolled down back and forth twice in each direction using a 2 kilogram (4.5 pound) rubber roller and the tape was peeled from the release surface of the film at a rate of 90 inches/minute (229 centimeters/minute) and an angle of 180 degrees. Three samples were run and the average value reported in ounces/inch (Newtons/decimeter). Release films desirably exhibited a release adhesion strength of between 10 and 50 ounces/inch (10.9 and 54.7 Newtons/decimeter) inclusive.

Paint Adhesion Test

The paint adhesion test was measured according to ASTM F1842-15: "Determining Ink or Coating Adhesion on Flexible Substrates for a Membrane Switch or Printed Electronic Device." Painted samples were prepared by first cutting film samples measuring approximately 7.5 centimeters (3 inches) wide and approximately 10 centimeters (4 inches) long. Two sets of samples were then painted in a two coat paint cycle with one set being painted with solvent based paints, and the second set being painted with water based paints. The solvent based paint samples were first painted with three coats of DELTRON 2000 (DBC) BASECOAT (available from PPG Automotive Refinish, Strongsville, Ohio) with one minute of drying between each coat and air dried for twenty minutes. Next, they were painted with two coats of DCU2082 STRATOCLEAR (available from PPG Automotive Refinish, Strongsville, Ohio) with one minute of drying between coats, then air dried for twenty hours. The water based paint samples were first painted with three coats of ENVIROBASE WHITE T400 BASECOAT (available from PPG Automotive Refinish, Strongsville, Ohio) with one minute of drying between each coat and air dried for twenty minutes. Next, they were painted with two coats of DELTRON® HIGH VELOCITY CLEARCOAT DC3000 (available from PPG Automotive Refinish, Strongsville, Ohio) with one minute of drying between coats, and finally the samples were dried in an oven for 30 minutes at 71° C. (160° F.).

After painting, samples were scored through the paint to the film layer with a tool, and a pressure sensitive adhesive tape, 3M PERFORMANCE YELLOW MASKING TAPE 301+(3M Company), was applied over the scored area and removed. The painted surface was inspected for removal of the paint by the tape and ranked on the 0-5 scale as noted in the test method. A rating of 5 was indicative of no removal of the paint from the release film, a rating of 4 indicated less than 5% of the paint was removed, a rating of 3 indicated between 5 to 15% of the paint was removed, a rating of 2 indicated between 15 to 35% of the paint was removed, a rating of 1 indicated between 35 to 65% of the paint was removed, and a rating of 0 was indicative of removal of 65% or more of the paint from the release film. In addition the painted film samples were examined for the presence of swelling by the paint. Film samples were desirably ranked as a 4 or 5, and exhibited no swelling.

Preparation of Adhesive 2 Coating Solution

A coating solution of Adhesive 2 was prepared by combining and mixing the following materials and amounts in a 1 gallon glass jar: 360 grams of NR, 38 grams of K11, 5 grams of 1800, 5 grams of WSL, 230 grams of E1304, 35 grams of ZN9, 9 grams of VT3, and 1600 grams of toluene. The jar was sealed and placed on a shaker and mixed for twenty-four hours at 73° F. (23° C.).

Examples 1-9 and Comparative Examples 4-8

Release films were prepared using a blown film process with the materials and amounts shown in Table 1 as follows. The amounts are given in weight percent (wt %). A blown film apparatus employing a seven layer, two inch diameter annular die was used to generate a seven layered tubular coextruded film having, in order, an inner release layer (Layer 1), an optional tie layer (Layer 2), and outer backing layer (Layers 2-7 if no tie layer was present or Layers 3-7 if a tie layer was present). Each layer was fed through separate 0.75 inch diameter Brabender extruders to provide individual layer thicknesses of approximately 0.0003 inches (7.6 micrometers) to 0.0004 inches (10.2 micrometers) each. The temperature profiles used are given below. A die temperature of 182° C. (360° F.) was used.

For Examples 1-9 and Comparative Examples 4-8 the following temperature profiles were used and extruders 2-7 were used for the backing layer composition:

| Extruder Number | Layer | Zone 1 ° C. (° F.) | Zone 2 ° C. (° F.) | Zone 3 ° C. (° F.) |
|---|---|---|---|---|
| 1 (Inside) | Release | 163 (325) | 182 (360) | 182 (360) |
| 2-7 (Outer) | Backing | 163 (325) | 182 (360) | 182 (360) |

For Examples 10-12 and Comparative Examples 1-3 the following temperature profiles were used, extruder 2 was used for the tie layer composition, and extruders 3-7 were used for the backing layer composition.

| Extruder Number | Layer | Zone 1 ° C. (° F.) | Zone 2 ° C. (° F.) | Zone 3 ° C. (° F.) |
|---|---|---|---|---|
| 1 (Inside) | Release | 163 (325) | 182 (360) | 182 (360) |
| 2 (Middle) | Tie | 163 (360) | 182 (360) | 182 (360) |
| 3-7 (Outside) | Backing | 182 (360) | 182 (360) | 182 (360) |

The resulting seven layered tubular coextruded blown films were collapsed to form a flat tube approximately 6 inches (15.2 cm) wide. The flat tube was cut open to provide a flat film article having: a release layer, an optional tie layer, and a backing layer. For Examples 1-12 and Comparative Examples 1-4 each layer was approximately 0.0004 inches (10.2 micrometers) thick and the total thickness was approximately 0.0028 inches (71 micrometers). For Comparative Examples 5-8 each layer was approximately 0.0003 inches (7.6 micrometers) thick and the total thickness was approximately 0.0021 inches (53 micrometers). The resulting film articles were then evaluated for paint receptivity and release adhesion strength as described in the test methods above. The results are shown in Tables 2 and 3 below.

Examples 13-14

Examples 1 and 8 were repeated to provide Examples 13 and 14 respectively with the following modifications. To a sample of the release film was provided a pressure sensitive adhesive layer, having thickness of approximately 58 micrometers (0.0023 inch), on the side of the film opposite that having the release layer as follows. Adhesive 1, obtained in the form of an adhesive transfer tape, measuring approximately 5.1 centimeters (2 inches) wide and approximately 20.3 centimeters (8 inches) long, was applied to the film surface on the side opposite that having the release layer, and rolled down back and forth twice in each direction using a 2 kilogram (4.5 pound) rubber roller. The resulting article was evaluated for the release adhesion strength between its adhesive layer and the release layer of a second sample of the release film as described in the test method above with the following modifications: After three days at ambient conditions, the release liner of the Adhesive 1 transfer tape was removed, the tape was conditioned for 24 hours at 23° C. and 50% RH, and the resulting single-sided pressure sensitive adhesive tape article was used in place of the SCOTCH BOX SEALING TAPE 311 for evaluation of Release Adhesion Strength. The results are shown in Table 4.

Examples 15-16

Examples 1 and 8 were repeated to provide Examples 15 and 16 respectively with the following modifications. To a sample of the release film was provided a pressure sensitive adhesive layer was provided on the side of the film opposite that having the release layer as follows. Adhesive 2 Coating Solution, 20 grams, was applied to the film surface on the side opposite that having the release layer using a notch bar coater having gap setting approximately 50 micrometers (0.0020 inches) greater than the film thickness. The Adhesive 2 coated film was then placed in an oven for five minutes at 66° C. (150° F.) to remove solvent. After removal from the oven the tape was conditioned for 24 hours at 23° C. and 50% RH, and the resulting article was evaluated for the release adhesion strength between its adhesive layer and the release layer of second sample of the release film as described in the test method above with the following modifications: the single-sided pressure sensitive adhesive tape article was used in place of the 3M PERFORMANCE YELLOW MASKING TAPE 301+. The results are shown in Table 4.

TABLE 1

Release Film Layer Compositions

| Ex. No. | Inner (Release) Layer of Bubble Layer 1 (innermost layer) | Layer 2 | Layer 3 | Layer 4 | Layer 5 | Layer 6 | Layer 7 (outermost layer) |
| --- | --- | --- | --- | --- | --- | --- | --- |
| 1 | PLA1/100 | PLA1:EVA3/75:25 | PLA1:EVA3/75:25 | PLA1:EVA3/75:25 | PLA1:EVA3/75:25 | PLA1:EVA3/75:25 | PLA1:EVA3/75:25 |
| 2 | PLA1:EVA1/75:25 | PLA1:EVA3/75:25 | PLA1:EVA3/75:25 | PLA1:EVA3/75:25 | PLA1:EVA3/75:25 | PLA1:EVA3/75:25 | PLA1:EVA3/75:25 |
| 3 | PLA1:EVA1/50:50 | PLA1:EVA3/75:25 | PLA1:EVA3/75:25 | PLA1:EVA3/75:25 | PLA1:EVA3/75:25 | PLA1:EVA3/75:25 | PLA1:EVA3/75:25 |
| 4 | PLA1:EVA1/25:75 | PLA1:EVA3/75:25 | PLA1:EVA3/75:25 | PLA1:EVA3/75:25 | PLA1:EVA3/75:25 | PLA1:EVA3/75:25 | PLA1:EVA3/75:25 |
| 5 | PLA1:EVA1/20:80 | PLA1:EVA3/75:25 | PLA1:EVA3/75:25 | PLA1:EVA3/75:25 | PLA1:EVA3/75:25 | PLA1:EVA3/75:25 | PLA1:EVA3/75:25 |
| 6 | PLA1:EVA1/15:85 | PLA1:EVA3/75:25 | PLA1:EVA3/75:25 | PLA1:EVA3/75:25 | PLA1:EVA3/75:25 | PLA1:EVA3/75:25 | PLA1:EVA3/75:25 |
| 7 | PLA1:EVA1/10:90 | PLA1:EVA3/75:25 | PLA1:EVA3/75:25 | PLA1:EVA3/75:25 | PLA1:EVA3/75:25 | PLA1:EVA3/75:25 | PLA1:EVA3/75:25 |
| 8 | PLA1:EMA/75:25 | PLA1:EVA3/75:25 | PLA1:EVA3/75:25 | PLA1:EVA3/75:25 | PLA1:EVA3/75:25 | PLA1:EVA3/75:25 | PLA1:EVA3/75:25 |
| 9 | PLA1:EMA/50:50 | PLA1:EVA3/75:25 | PLA1:EVA3/75:25 | PLA1:EVA3/75:25 | PLA1:EVA3/75:25 | PLA1:EVA3/75:25 | PLA1:EVA3/75:25 |
| 10 | PLA1:EMA/25:75 | PLA1:EVA3/75:25 | PLA1:EVA3/75:25 | PLA1:EVA3/75:25 | PLA1:EVA3/75:25 | PLA1:EVA3/75:25 | PLA1:EVA3/75:25 |
| 11 | PLA1:EMA/20:80 | PLA1:EVA3/75:25 | PLA1:EVA3/75:25 | PLA1:EVA3/75:25 | PLA1:EVA3/75:25 | PLA1:EVA3/75:25 | PLA1:EVA3/75:25 |
| 12 | PLA1:EMA/15:85 | PLA1:EVA3/75:25 | PLA1:EVA3/75:25 | PLA1:EVA3/75:25 | PLA1:EVA3/75:25 | PLA1:EVA3/75:25 | PLA1:EVA3/75:25 |
| 13 | PLA1:EMA/10:90 | PLA1:EVA3/75:25 | PLA1:EVA3/75:25 | PLA1:EVA3/75:25 | PLA1:EVA3/75:25 | PLA1:EVA3/75:25 | PLA1:EVA3/75:25 |
| 14 | PLA2/100 | PLA1:EVA3/75:25 | PLA1:EVA3/75:25 | PLA1:EVA3/75:25 | PLA1:EVA3/75:25 | PLA1:EVA3/75:25 | PLA1:EVA3/75:25 |
| 15 | PLA1:EVA2:EMA/60:20:20 | PLA1:EVA3/75:25 | PLA1:EVA3/75:25 | PLA1:EVA3/75:25 | PLA1:EVA3/75:25 | PLA1:EVA3/75:25 | PLA1:EVA3/75:25 |
| 16 | PLA1:PLA2/50:50 | PLA1:EVA3/75:25 | PLA1:EVA3/75:25 | PLA1:EVA3/75:25 | PLA1:EVA3/75:25 | PLA1:EVA3/75:25 | PLA1:EVA3/75:25 |
| 17 | PLA1/100 | LDPE/100 | LDPE/100 | LDPE/100 | LDPE/100 | LDPE/100 | LDPE/100 |
| 18 | PLA1/100 | EVA2:EVA3/50:50 | EVA4/100 | EVA4/100 | EVA4/100 | EVA4/100 | EVA4/100 |
| 19 | PLA1/100 | EVA2:EVA3/50:50 | TPE/100 | TPE/100 | TPE/100 | TPE/100 | TPE/100 |
| 20 | PLA1/100 | EVA2:EVA3/50:50 | TPO/100 | TPO/100 | TPO/100 | TPO/100 | TPO/100 |
| CE1 | LDPE:OMS/75:25 | EVA2:EVA3/50:50 | PLA1:EVA3/75:25 | PLA1:EVA3/75:25 | PLA1:EVA3/75:25 | PLA1:EVA3/75:25 | PLA1:EVA3/75:25 |
| CE2 | LDPE:P-77:EAA/45:30:25 | EVA2:EVA3/50:50 | PLA1:EVA3/75:25 | PLA1:EVA3/75:25 | PLA1:EVA3/75:25 | PLA1:EVA3/75:25 | PLA1:EVA3/75:25 |
| CE3 | LDPE:BS/90:10 | EVA2:EVA3/50:50 | PLA1:EVA3/75:25 | PLA1:EVA3/75:25 | PLA1:EVA3/75:25 | PLA1:EVA3/75:25 | PLA1:EVA3/75:25 |
| CE4 | PLA1:EVA3/75:25 | PLA1:EVA3/75:25 | PLA1:EVA3/75:25 | PLA1:EVA3/75:25 | PLA1:EVA3/75:25 | PLA1:EVA3/75:25 | PLA1:EVA3/75:25 |
| CE5 | EVA2/100 | PLA1:EVA3/75:25 | PLA1:EVA3/75:25 | PLA1:EVA3/75:25 | PLA1:EVA3/75:25 | PLA1:EVA3/75:25 | PLA1:EVA3/75:25 |
| CE6 | EVA2:EMA/50:50 | PLA1:EVA3/75:25 | PLA1:EVA3/75:25 | PLA1:EVA3/75:25 | PLA1:EVA3/75:25 | PLA1:EVA3/75:25 | PLA1:EVA3/75:25 |
| CE7 | EVA1:EMA/50:50 | PLA1:EVA3/75:25 | PLA1:EVA3/75:25 | PLA1:EVA3/75:25 | PLA1:EVA3/75:25 | PLA1:EVA3/75:25 | PLA1:EVA3/75:25 |
| CE8 | PLA1:EVA3:OMS/43:50:7 | PLA1:EVA3/75:25 | PLA1:EVA3/75:25 | PLA1:EVA3/75:25 | PLA1:EVA3/75:25 | PLA1:EVA3/75:25 | PLA1:EVA3/75:25 |
| CE9 | PLA1:EMA/5:95 | PLA1:EVA3/75:25 | PLA1:EVA3/75:25 | PLA1:EVA3/75:25 | PLA1:EVA3/75:25 | PLA1:EVA3/75:25 | PLA1:EVA3/75:25 |
| CE10 | PLA1:EVA1/5:95 | PLA1:EVA3/75:25 | PLA1:EVA3/75:25 | PLA1:EVA3/75:25 | PLA1:EVA3/75:25 | PLA1:EVA3/75:25 | PLA1:EVA3/75:25 |

TABLE 2

Release Adhesion Strength

| Example | 301+ Initial Release (oz/in.) oz/in. (N/dm) | 301+ 7 Day Release oz/in. (N/dm) | 311 Initial Release (oz/in.) oz/in. (N/dm) | 311 7 Day Release oz/in. (N/dm) |
|---|---|---|---|---|
| 1 | 34.5 (37.8) | 40.8 (44.7) | 28.3 (30.9) | 34.3 (37.6) |
| 2 | 32.6 (35.6) | 39.5 (43.2) | 28.8 (31.5) | 40.0 (43.80) |
| 3 | 31.2 (34.2) | 30.3 (33.2) | 23.8 (26.1) | 36.9 (40.4) |
| 4 | 25.0 (27.3) | 26.3 (28.8) | 21.0 (23.0) | 36.2 (39.6) |
| 5 | 30.2 (33.0) | 31.1 (34.0) | 25.0 (27.3) | 31.9 (34.9) |
| 6 | 25.2 (27.6) | 30.6 (33.5) | 25.3 (27.6) | 33.0 (36.1) |
| 7 | 28.4 (31.0) | 36.2 (39.7) | 21.0 (23.0) | 28.7 (31.4) |
| 8 | 30.1 (32.9) | 39.2 (42.9) | 32.5 (35.6) | 39.1 (42.8) |
| 9 | 31.3 (34.2) | 39.2 (42.9) | 24.6 (27.0) | 38.2 (41.8) |
| 10 | 32.2 (35.2) | 39.0 (42.7) | 24.2 (26.5) | 34.8 (38.1) |
| 11 | 34.6 (32.9) | 39.7 (43.4) | 25.9 (28.4) | 38.7 (42.3) |
| 12 | 32.9 (36.0) | 40.0 (43.8) | 23.7 (25.9) | 40.0 (43.8) |
| 13 | 22.3 (24.5) | 29.7 (32.6) | 18.7 (20.4) | 25.0 (27.4) |
| 14 | 24.0 (26.3) | 30.4 (33.3) | 14.2 (15.6) | 18.9 (20.6) |
| 15 | 21.9 (23.9) | 29.3 (32.1) | 13.4 (14.6) | 18.4 (20.1) |
| 16 | 21.0 (23.0) | 23.9 (26.1) | 14.9 (16.3) | 19.7 (21.5) |
| 17 | 24.3 (26.6) | 31.1 (34.1) | 12.9 (14.1) | 16.0 (17.5) |
| 18 | 23.0 (25.2) | 29.7 (32.5) | 10.5 (11.5) | 13.9 (15.2) |
| 19 | 30.0 (32.8) | 39.6 (43.3) | 20.2 (22.1) | 26.9 (29.4) |
| 20 | 30.0 (32.8) | 35.1 (38.4) | 22.0 (24.1) | 29.6 (32.4) |
| CE1 | 0.9 (1.0) | 1.8 (2.0) | 0.7 (0.8) | 4.6 (5.1) |
| CE2 | 9.8 (10.7) | 15.2 (16.6) | 1.6 (1.8) | 1.2 (1.3) |
| CE3 | 13.6 (14.9) | 13.4 (14.7) | 2.7 (3.0) | 2.3 (2.5) |
| CE4 | 27.6 (30.2) | 34.0 (37.2) | 28.2 (30.9) | 36.9 (40.4) |
| CE5 | 31.8 (34.8) | 36.3 (39.8) | 19.5 (21.4) | 25.6 (28.0) |
| CE6 | 24.4 (26.7) | 25.7 (28.1) | 17.1 (18.7) | 25.3 (27.7) |
| CE7 | 21.4 (23.5) | 26.1 (28.6) | 6.1 (6.7) | 7.6 (8.3) |
| CE8 | 11.9 (13.0) | 18.0 (19.7) | 3.1 (3.4) | 4.0 (4.4) |
| CE9 | 20.1 (22.0) | 24.8 (27.1) | 9.5 (10.4) | 12.0 (13.1) |
| CE10 | 23.6 (25.9) | 32.7 (35.8) | 8.9 (9.8) | 11.5 (12.6) |

TABLE 3

Paint Adhesion Results

| Ex. | Solvent Based Paint Adhesion Rating (0-5) | Visual | Water Based Paint Adhesion Rating (0-5) | Visual |
|---|---|---|---|---|
| 1 | 5 | Good | 5 | Good |
| 2 | 5 | Good | 5 | Good |
| 3 | 5 | Good | 5 | Good |
| 4 | 5 | Good | 5 | Good |
| 5 | 5 | Good | 5 | Good |
| 6 | 5 | Good | 5 | Good |
| 7 | 5 | Good | 5 | Good |
| 8 | 5 | Good | 5 | Good |
| 9 | 5 | Good | 5 | Good |
| 10 | 5 | Good | 5 | Good |
| 11 | 5 | Good | 5 | Good |
| 12 | 5 | Good | 5 | Good |
| 13 | 5 | Good | 5 | Good |
| 14 | 5 | Good | 5 | Good |
| 15 | 5 | Good | 5 | Good |
| 16 | 5 | Good | 5 | Good |
| 17 | 5 | Good | 5 | Good |
| 18 | 5 | Good | 5 | Good |
| 19 | 4 | Good | 4 | Good |
| 20 | 5 | Good | 5 | Good |
| CE1 | 0 | No bond between paint/film | 1 | Poor bond between paint/film |
| CE2 | 0 | No bond between paint/film | 1 | Poor bond between paint/film |
| CE3 | 0 | No bond between paint/film | 1 | Poor bond between paint/film |
| CE4 | 4 | Sample swelled | 5 | Good |
| CE5 | 5 | Good | 5 | Good |
| CE6 | 5 | Good | 5 | Good |
| CE7 | 5 | Good | 5 | Good |
| CE8 | 4 | Sample swelled | 5 | Good |
| CE9 | 5 | Good | 5 | Good |
| CE10 | 5 | Good | 5 | Good |

TABLE 4

Release Adhesion Strength

| Example | Adhesive 1 Release Adhesion Strength oz/in. (N/dm) | Adhesive 2 Release Adhesion Strength oz/in. (N/dm) |
|---|---|---|
| 13 | 22.6 (24.7) | ND |
| 14 | 23.1 (25.3) | ND |
| 15 | ND | 35.6 (39.0) |
| 16 | ND | 32.6 (35.7) |

ND: not determined

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A film construction comprising:
   a backing having a first major surface and a second major surface; and
   a release layer disposed on the first major surface of the backing, wherein the release layer comprises a polymer mixture comprising polylactic acid and an ethylene-containing copolymer;
   wherein the ethylene-containing copolymer comprises ethylene and at least one polar comonomer; and
   wherein the at least one polar comonomer is selected such that the ethylene-containing copolymer does not adversely impact the paintability, printability, or otherwise image receptivity of the release layer.

2. The film construction of claim 1 wherein the ethylene-containing copolymer comprises ethylene and at least two polar comonomers.

3. The film construction of claim 1 wherein the ethylene-containing copolymer comprises an ethylene-(meth)acrylate ester copolymer, carbon monoxide modified ethylene/vinyl acetate, or a mixture thereof.

4. The film construction of claim 1 further comprising a tie layer disposed on the first major surface of the backing, wherein the release layer is disposed directly on the tie layer.

5. The film construction of claim 4 wherein the tie layer comprises an ethylene-containing copolymer.

6. The film construction of claim 5 wherein the tie layer comprises at least two different ethylene-containing copolymers, each comprising a polar comonomer that may or may not be the same.

7. The film construction of claim 1 wherein the backing comprises a layer comprising an extrudable material.

8. The film construction of claim 7 wherein the extrudable material comprises a polyester, polyolefin, thermoplastic elastomer, polyurethane, or a mixture thereof.

9. The film construction of claim 8 wherein the backing comprises at least one backing layer comprising polylactic acid and an ethylene-containing copolymer comprising a polar comonomer.

10. The film construction of claim 8 wherein the backing comprises at least one backing layer comprising a polyolefin.

11. The film construction of claim 1 wherein the polylactic acid of the release layer comprises amorphous polylactic acid, semicrystalline polylactic acid, or a mixture thereof.

12. The film construction of claim 1 wherein the amount of polylactic acid in the release layer is at least 10 wt-%, based on the total weight of the release layer.

13. The film construction of claim 1 wherein the amount of polylactic acid in the release layer is up to but not including 100 wt-%, based on the total weight of the release layer.

14. The film construction of claim 1 which possesses a release adhesion strength of 10.9 N/dm to 54.7 N/dm.

15. An article comprising:
a film construction comprising:
a backing having a first major surface and a second major surface; and
a release layer disposed on the first major surface of the backing, wherein the release layer comprises a polymer mixture comprising polylactic acid and an ethylene-containing copolymer;
wherein the ethylene-containing copolymer comprises ethylene and at least one polar comonomer; and
wherein the at least one polar comonomer is selected such that the ethylene-containing copolymer does not adversely impact the paintability, printability, or otherwise image receptivity of the release layer; and
an adhesive layer disposed on the second major surface of the backing layer.

16. A film construction comprising:
an adhesive layer having a first major surface and a second major surface; and
a release layer disposed on the first major surface of the adhesive layer, wherein the release layer comprises a polymer mixture comprising polylactic acid and an ethylene-containing copolymer;
wherein the ethylene-containing copolymer comprises ethylene and at least one polar comonomer; and
wherein the at least one polar comonomer is selected such that the ethylene-containing copolymer does not adversely impact the paintability, printability, or otherwise image receptivity of the release layer.

17. The film construction of claim 16 wherein the second major surface of the adhesive layer has a second release layer disposed thereon.

18. The film construction of claim 16 wherein the second major surface of the adhesive layer is disposed on a backing.

19. The film construction of claim 16 wherein the release layer is disposed between the adhesive layer and a backing.

* * * * *